US011925188B2

(12) United States Patent
Fultz et al.

(10) Patent No.: US 11,925,188 B2
(45) Date of Patent: Mar. 12, 2024

(54) CULTURED DAIRY PRODUCTS AND METHOD OF PREPARATION

(71) Applicant: General Mills, Inc., Minneapolis, MN (US)

(72) Inventors: Jerry L Fultz, New Hope, MN (US); Jose Antonio Maldonado, Edina, MN (US); Maeve C Murphy, Plymouth, MN (US); Shannyn Stuart, Wheaton, IL (US)

(73) Assignee: General Mills, Inc., Minneapolis, MN (US)

(*) Notice: Subject to any disclaimer, the term of this patent is extended or adjusted under 35 U.S.C. 154(b) by 1409 days.

(21) Appl. No.: 16/013,224

(22) Filed: Jun. 20, 2018

(65) Prior Publication Data

US 2019/0387762 A1 Dec. 26, 2019

(51) Int. Cl.

| | |
|---|---|
| ***A23C 9/12*** | (2006.01) |
| ***A23C 3/02*** | (2006.01) |
| ***A23C 9/00*** | (2006.01) |
| ***A23C 9/13*** | (2006.01) |
| ***A23C 9/142*** | (2006.01) |

(52) U.S. Cl.

CPC .............. *A23C 9/1223* (2013.01); *A23C 3/02* (2013.01); *A23C 9/005* (2013.01); *A23C 9/1307* (2013.01); *A23C 9/1422* (2013.01); *A23C 2210/256* (2013.01); *A23V 2002/00* (2013.01); *A23V 2250/5424* (2013.01); *A23V 2250/612* (2013.01)

(58) Field of Classification Search

None

See application file for complete search history.

(56) References Cited

U.S. PATENT DOCUMENTS

| | | | | |
|---|---|---|---|---|
| 4,956,186 A | 9/1990 | Streiff et al. | | |
| 6,183,802 B1 | 2/2001 | Silva et al. | | |
| 6,635,302 B1 * | 10/2003 | Huang ................ | A23C 9/1422 | 426/587 |
| 2004/0040448 A1 * | 3/2004 | Dunker ............... | A23C 9/1512 | 99/452 |

(Continued)

FOREIGN PATENT DOCUMENTS

| | | |
|---|---|---|
| CN | 102960446 | 3/2013 |
| FR | 2224096 | 10/1974 |
| WO | WO 2016/196088 | 12/2016 |

OTHER PUBLICATIONS

W Minifie 1989 Chocolate, Cocoa, and Confectionary: Science and Technology 3rd edition Chapter 10 Milk and Milk Products p. 304 (Year: 1989).*

(Continued)

*Primary Examiner* — Felicia C Turner

(74) *Attorney, Agent, or Firm* — Diederiks & Whitelaw, PLC; Annette M. Frawley, Esq.

(57) ABSTRACT

A method for preparing a cultured dairy product comprising: blending water, ultra-filtered milk and other ingredients to form a blended milk containing about 1.6% lactose, about 3.9% protein and about 0.8% fat; culturing the blended milk by adding a starter culture and fermenting the blended milk to produce a cultured dairy product; and processing the cultured dairy product with only mechanical steps to form a finished cultured dairy product containing less than 4% total sugar and less than 0.1% lactose.

20 Claims, 1 Drawing Sheet

(56) References Cited

U.S. PATENT DOCUMENTS

| | | | | |
|---|---|---|---|---|
| 2006/0068075 | A1* | 3/2006 | Fultz | A23C 9/1307<br>426/583 |
| 2008/0292768 | A1 | 11/2008 | Nguyen et al. | |
| 2015/0342208 | A1 | 12/2015 | Bunce et al. | |
| 2016/0000101 | A1 | 1/2016 | Alcantar et al. | |
| 2016/0143304 | A1* | 5/2016 | Havlik | A23C 9/1206<br>426/42 |
| 2016/0353760 | A1 | 12/2016 | Ur-Rehman et al. | |
| 2017/0181443 | A1* | 6/2017 | McCormick | A23L 27/36 |
| 2017/0311635 | A1* | 11/2017 | Mimouni | A23L 3/015 |
| 2017/0354161 | A1* | 12/2017 | Queguiner | B65D 85/72 |
| 2019/0387762 | A1 | 12/2019 | Fultz et al. | |

OTHER PUBLICATIONS

Alvarez et al., "*Fermentation Concentrated Skim-Milk. Effects of Different Protein/Lactose Ratios Obtained by Ultrafiltration-Diafiltration*", Journal of the Science of Food and Agriculture, vol. 76, No. 1, pp. 10-16, 1998.

Kosikowski, "*Low Lactose Yogurts and Milk Beverages by Ultrafiltration*", Journal of Dairy Science, vol. 62, No. 1, pp. 41-46, 1979.

Hugunin, "U.S. Whey Ingredients in Yogurt and Yogurt Beverages", retrieved from the Internet, http://www.thinkusadairy.org/Documents/Customer_Site/C3-Using_Dairy/C3,7-Resources_and_Insights/03-Application_and_Technical_Materials,YOGURT_ENG.pdf, 2009.

* cited by examiner

CULTURED DAIRY PRODUCTS AND METHOD OF PREPARATION

FIELD OF THE INVENTION

The present invention relates to a cultured dairy product. More particularly, the present invention is directed to producing a cultured dairy product with low sugar.

BACKGROUND OF THE INVENTION

Bacterial cultures are used for production of fermented foods and contribute to the flavor, texture and overall characteristics of these products. A well-known example of a fermented dairy product is yogurt. Yogurt is produced from milk that has been inoculated with a bacterial culture and fermented. Typically, the bacterial culture contains lactic acid producing bacteria such as *Lactobacillus bulgaricus* and/or *Streptococcus thermophilus*. Lactose is a sugar that is present in milk. According to conventional wisdom, a generous amount of lactose is needed to allow the milk to ferment in a reasonable amount of time. During the fermentation, the bacteria consume some of the lactose, but a significant amount of the lactose is not consumed and remains in the yogurt produced during the fermentation. The fermentation process produces yogurt that has a bitter or acrid taste. Therefore, sugar (i.e., sucrose) is usually added to the yogurt to improve the taste.

Cultured dairy products are available in a wide variety of styles and formulations to meet the various desires of consumers. However, there is still a continuing need to provide new and improved cultured dairy products, especially having characteristics that are appealing to consumers. One area of particular interest is the consumer's desire for a low-sugar yogurt. In response, industry has produced numerous yogurts in which the sucrose has been replaced with artificial sweeteners such as sucralose, aspartame and saccharin. The resulting yogurt has low sugar and calorie contents, but is still sweet. However, not all consumers desire products employing artificial sweeteners. As such, there is a need in the art to produce a cultured dairy product that does not employ artificial sweeteners but still has an appealing taste and a reduced amount of sugar for listing on the label.

SUMMARY OF THE INVENTION

The present disclosure relates to cultured dairy products having low or minimal amounts of residual sugar. One preferred embodiment includes a method of producing the cultured dairy products by blending a variety of milk streams, including streams that have been ultra filtered, to achieve a dairy blend with desired target amounts of protein, fat and lactose to produce a milk blend with a low amount of lactose which is designed to be consumed during fermentation. An exemplary product is a plain yogurt with very low residual sugar compared to conventional yogurts on the market.

In one aspect, the method includes blending water, ultra-filtered milk containing from 0.3% to 1.0% lactose, from 11% to 15% protein, and about 0.3% fat, condensed whole milk containing about 11.3% lactose, about 7.6% protein, and about 15% fat, and condensed skim milk containing about 19.4% lactose, about 12.7% protein, and about 0.2% fat to form a blended milk or fermentable dairy base preferably containing about 1.6% lactose, about 2.7 to 4% protein and about 0 to 1.5% fat and, more preferably, about 1.6% lactose, about 3.9% protein and about 0.8% fat. Preferably, the amounts of lactose, protein and fat in the dairy base are obtained only by blending such that no added enzymes are needed.

The method also includes pasteurizing the dairy base preferably within a temperature range from 185° F. to 200° F. (85° C. to 93.3° C.) for 5 to 10 minutes and, more preferably, at 195° F. (90.6° C.) for 6 minutes and 40 seconds, culturing the dairy base by adding yogurt starter culture and fermenting the dairy base at 112° F. (44.4° C.) for 5 hours to produce a yogurt product. In some embodiments this step is followed by cooling down the yogurt product to 40° F. (4.4° C.) for storage. Thereafter, the yogurt product is preferably warmed up to between 90° F. to 155° F. (32.2° C. to 68.3° C.) and, more preferably, to 110° F. (43.3° C.) after storage. The next step is separating the yogurt product in a centrifuge to obtain a separated yogurt product containing about 0.7% lactose, about 11.5% protein and about 2.0% fat. The separated yogurt is then subjected to cavitation at 60 Hz with a 3 mm gap. After cavitation, the next steps are cooling down the separated yogurt to 45° F. (7.2° C.) for storage and then, after storage, producing a finished yogurt product preferably containing less than 10% lactose, 8-13% protein and 0-4% fat and, more preferably, less than 4% total sugar (of which less than 1% is lactose), greater than 10% protein and 1.8% fat.

Lactose, although a sugar, is not particularly sweet, at least in yogurt, and therefore reducing the amount of lactose in the ingredients used to produce yogurt reduces sugar content but not sweetness of the resulting yogurt product. Also, despite the conventional wisdom that high levels of lactose are needed in the fermenting process to produce yogurt, surprisingly the present method produces a dairy base that ferments in a reasonable amount of time to produce a yogurt product with almost no residual lactose. These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawing, in which.

DETAILED DESCRIPTION OF THE PREFERRED EMBODIMENTS

Figure 1:
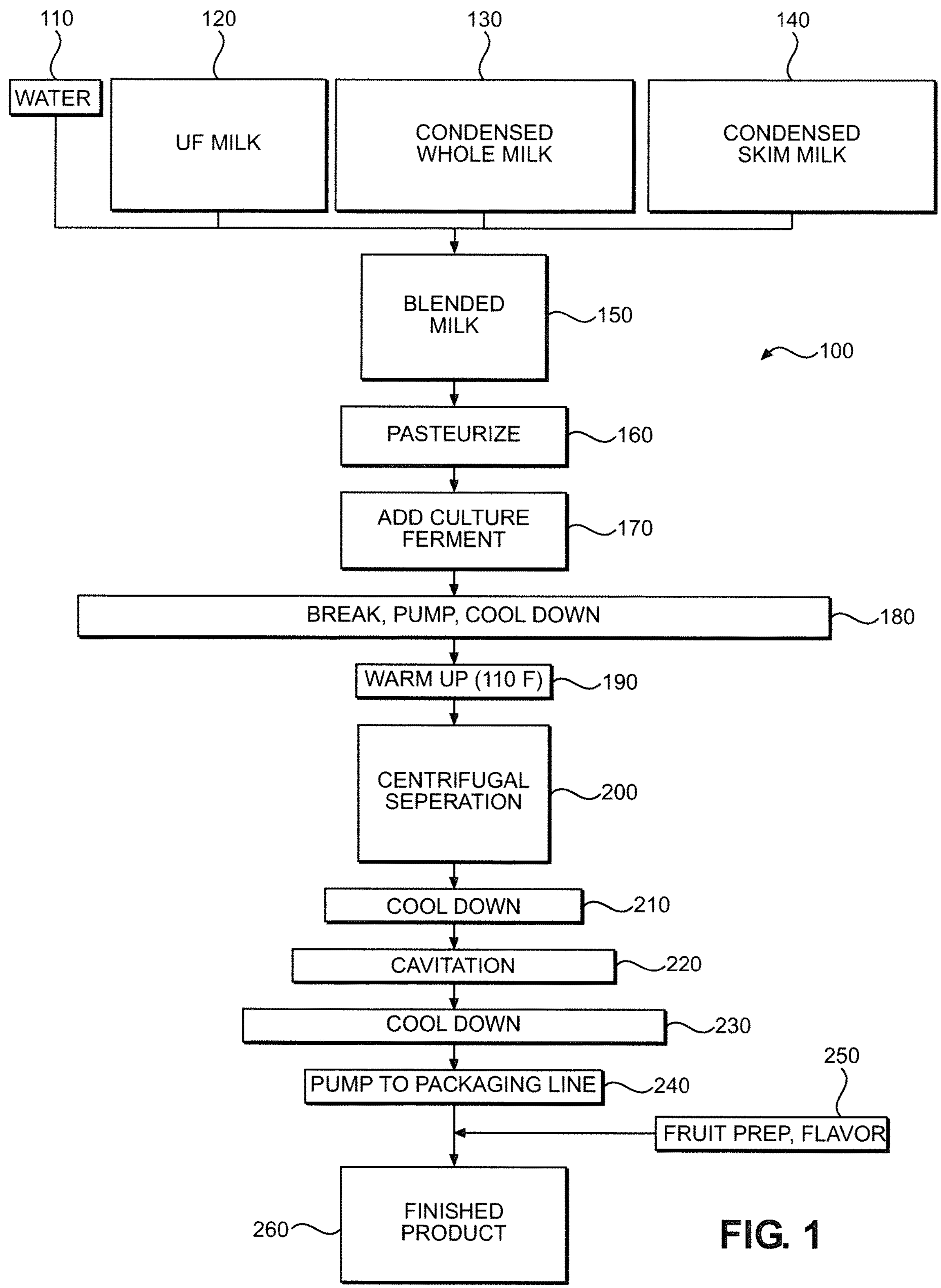
FIG. 1 is flowchart showing method steps used to produce a yogurt product in accordance with the invention.

In the following detailed description, reference is made to the accompanying drawing that forms a part hereof and in which is shown, by way of illustration, a specific embodiment. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts and physical properties used in the specification and claims are to be understood as being modified in all instances by the term "about". Accordingly, unless indicated to the contrary, the numerical parameters set forth in the foregoing specification and attached claims are approximations that can vary depending upon the properties sought to be obtained by those skilled in the art utilizing the teachings disclosed herein. In particular, any specific numerical value listed herein includes a margin of error of +/−10%. Accordingly, a temperature of 10.0° C. includes temperatures between 9.0 and 11.0° C. Similarly, a range of 8.0-12.0° C. includes temperatures between 7.2 and 13.2° C. For numerical values expressed as percentages, the margin of error refers to the base numerical value. In other words, 20% means 18-22% and not 10-30%. Also, all ingredient percentages are in weight percent unless otherwise indicated.

The recitation of numerical ranges by endpoints includes all numbers subsumed within that range and any range within that range.

Turning now to FIG. 1, an embodiment of a process for manufacture of a cultured dairy product with low lactose according to the invention is generally indicated by reference numeral 100. In general, the cultured dairy product is made from a fermentable dairy base and bacterial culture. While three fermentable dairy ingredients (120, 130, 140) are shown, in general, the resulting blended milk or fermentable dairy base 150 of the invention includes at least two fermentable dairy ingredients. A fermentable dairy ingredient can include raw milk or a combination of whole milk, skim milk, condensed milk and/or dry milk (for example, dry milk solids non-fat, or milk protein concentrate). Preferably, the fermentable dairy ingredient is composed of bovine milk. However, if desired, other milks can be used as a partial or whole substitute for bovine milk, such as camel, goat, sheep or equine milk. The fermentable dairy ingredient can also comprise grade-A whey, cream and/or such other milk fraction ingredients as buttermilk, whey, lactalbumins, lactoglobulins, or whey modified by partial or complete removal of lactose and/or minerals, and/or other dairy ingredients to increase the nonfat solids content, which are blended to provide the desired fat and solids content. If desired, the dairy base can include a filled milk component, such as a milk ingredient having a portion supplied by a non-milk ingredient (for example, oil or soybean milk).

In an initial step of the preferred embodiment of FIG. 1, water 110, ultra-filtered (UF) milk 120, condensed whole milk 130, and condensed skim milk 140 are mixed or blended to form fermentable dairy base 150.

Ultra-filtered milk 120 is formed by passing milk through a membrane that allows water, some lactose and other soluble milk contents to pass, but retains milk proteins and fats. Ultrafiltration of milk will remove at least some of the lactose and results in an ultra-filtered milk preferably containing 0.3% to 1% lactose, 11% to 15% protein and 0.3% fat. In other embodiments, the amounts of these three ingredients can differ. The lactose more preferably ranges from 0.3% to 0.8%. The protein more preferably ranges from 13% to 15% and is most preferably 14%.

Condensed whole milk 130 is preferably any commercially available condensed whole milk or, more preferably, condensed whole milk with about 11.3% lactose, about 7.6% protein and about 15% fat. Condensed skim milk 140 is preferably any commercially available condensed skim milk or, more preferably, condensed skim milk with about 19.4% lactose, about 12.7% protein and about 0.2% fat. Dairy base 150 preferably contains about 1.6% lactose, about 2.7 to 4% protein and about 0 to 1.5% fat and, more preferably, about 1.6% lactose, about 3.9% protein and about 0.8% fat. In other embodiments, only two dairy ingredients are used to form dairy base 150. For example, ultra-filtered milk is mixed only with condensed skim milk or only with condensed whole milk, or mixed with milk that has not been condensed, The blending of the ingredients that form dairy base 150 is conducted in a mix tank. The dairy base ingredients are admixed to form a homogeneous or well-blended mix to disperse evenly the added materials and the fat component supplied by various ingredients, thereby forming homogenized dairy base 150. However, no additional steps are needed to obtain the lactose levels in dairy base 150 as they are preferably obtained with only blending and preferably no enzymes are added. In some embodiments, the cultured dairy product is not separated, in which case the milk ingredients and sweeteners (such as fructose, corn syrup, sucrose) can also be blended in the mix tank with stabilizers and thickeners, such as starch, gelatin, pectin, agar and carrageenan, can also be added, if desired. It is desirable that thickening of dairy base 150 occurs after heat treatment 160 such as during a fermentation step 170. If desired, dairy base 150 can be warmed, prior to mixing, from typical milk storage temperatures of 40° F. (4.4° C.) to temperatures of 150° F. (65.6° C.) to 170° F. (76.7° C.), preferably 160° F. (71.1° C.). Dairy base 150 preferably further includes calcium.

Dairy base 150 is heat treated or pasteurized at step 160, typically by heating for times and temperatures effective to accomplish pasteurization to form a pasteurized or heat treated dairy base. In certain embodiments, dairy base 150 can be heated to lower temperatures for extended times, e.g., 180° F. (82.2° C.) for 30 minutes, or alternatively to higher temperatures for shorter times, e.g., 205° F. (96.1° C.) for 38 seconds. Of course, intermediate temperatures for intermediate times can also be employed. Other pasteurization techniques or, less preferably, even sterilization can be practiced (e.g., light pulse, ultra-high temperature, ultra-high pressure, etc.) if effective and economical. Preferably, dairy base 150 is pasteurized at 190° F. (87.8° C.)-198° F. (92.2° C.) for 6 to 8 minutes and, more preferably, 195° F. (90.6° C.) for 6 minutes and 40 seconds.

In many embodiments, different types of milk can be fermented with yogurt bacteria such as *Streptococcus thermophilus* and *Lactobacillus delbrueckii* subspecies *bulgaricus*. Optionally, this fermentation step 170 also includes the addition of other lactic acid bacteria, such as *Bifidobacterium* and/or *Lactobacillus acidophilus* and/or *Lactobacillus casei* and/or *Lactobacillus rhamnosus* and/or *Lactobacillus reuteri* and/or *Lactobacillus johnsonii* and/or *Lactobacillus plantarum* and/or *Lactobacillus helveticus* and/or *Lactobacillus fermentum* and/or *Lactobaciluus amylovorus* and/or *Lactoccocus lactis* and/or *Leuconostoc mesenteroides*. After inoculation of dairy base 150, fermentation can be conducted under the conditions suitable for growth of the inoculated bacteria. The fermentation at step 170 can be stopped when the fermentation medium reaches the desired target pH, in particular from 4 to 4.8, preferably 4.6. In a preferred preparation of yogurt herein, fermentation step 170 is continued until the pH of the inoculated dairy base mix blend reaches approximately 4.2 to 4.6 to form a yogurt base. Depending upon the temperature and amount of culture added, this can take from 3 to 14 hours. Preferably, dairy base 150 is fermented by adding yogurt starter culture and maintaining dairy base 150 at 112° F. (44.4° C.) for about 5 hours to produce a yogurt product. In the preparation of a most cultured dairy products, it is important that the mixture not be agitated during the fermentation process to allow proper curd formation. The yogurt if prepared without a separation step will preferably have a viscosity of at least 1500 centipoise (cps), preferably at least 2300 cps (at 40° F. (4.4° C.)). Yogurt viscosities can range up to 45,000 cps.

When the proper pH has been reached, the fermenting is stopped at step 180. Also, the yogurt is cooled (e.g., to 40 to 70° F. (4.4 to 21.1° C.), preferably less than 44° F. (6.7° C.), and, more preferably, less than 40° F. (4.4° C.) to arrest further growth and any further drop in the pH to form a cooled yogurt base. The cooled base is optionally pumped to a storage tank.

The fermented dairy material or yogurt is then processed through several mechanical steps such as cavitation and separation. Preferably the yogurt is only subjected to mechanical steps such that no enzymes need to be added. The yogurt product is warmed up to 110° F. (43.3° C.) at step 190 and is optionally subjected to centrifugal separation at step 200, which includes separating the yogurt product in a centrifuge to obtain, in an exemplary embodiment, a separated yogurt product containing 0.7% lactose, 11.5% protein and 2.0% fat. Alternatively, a product could be made without centrifugation, using ultra filtered milk and the other milks to control the lactose level. Such a product would have stabilizers, starch, gelatin to build body. Then, the next step at 210 involves cooling down the separated yogurt to between 55.0° F. (12.8° C.) and 75.0° F. (23.9° C.).

The yogurt can be passed through a cavitation unit 220 (preferably a continuous unit operation) to form a cavitated dairy product. Passing a fermented dairy material through a cavitation unit operation surprisingly forms a dairy product having enhanced creaminess. The controlled cavitation process surprisingly changes the rheological properties of the fermented dairy product (such as yogurt or Greek yogurt). The cavitation unit operation generates controlled hydrodynamic cavitation within the fermented dairy material to form the cavitated dairy product. In one embodiment, the cavitation unit operation comprises a rotor within a housing. The rotor has a plurality of cavities that generate hydrodynamic cavitation within the fermented dairy material when the rotor spins within the housing. The spinning action generates controlled hydrodynamic cavitation within the cavities. Microscopic cavitation bubbles are produced and, as they collapse, shockwaves are given off into the fermented dairy material, altering the structure and rheological properties of the fermented dairy material. This example of a cavitation unit operation is commercially available under the trade designation APV CAVITTOR from SPX Flow Technology (Silkeborg, Denmark). Preferably, the method involves subjecting the separated yogurt to cavitation at 60 Hz with less than a 6 mm gap and preferably a 3 mm gap. At step 230, the yogurt is cooled to 45° F. (7.2° C.) and stored, if needed.

Next, at step 240, the cooled yogurt is pumped to a packaging line to produce, at step 260, a finished yogurt product containing less than 4% total sugar, and preferably less than 1% (of which less than 1% is lactose, and, more preferably, of which there is less than 0.1% lactose or no measureable lactose), greater than 10% protein and about 1.8% fat. When included, stabilizers or thickeners can be provided in an amount sufficient to establish a desired viscosity to the cultured dairy composition, such that the cultured dairy composition can be processed (e.g., pumped) through equipment. Examples of useful stabilizers and thickeners are pectin, agar, carrageenan, gellan gum, xanthan gum, carboxy methyl cellulose (CMC), sodium alginate, hydroxy propyl, methyl cellulose, and mixtures thereof.

Optionally, at step 250, the method includes adding fruit flavor. When included, fruit and fruit extracts (e.g., sauces or purees) can comprise 1% to 40%, preferably from 5% to 15% of the cultured dairy composition. The fruit component can be admixed with an emulsifier prior to addition to the first dairy base or can be added as a separate component, as desired. Other ingredients can also be added, such as sweeteners, flavor ingredient(s), process viscosity modifier(s), vitamin(s), nutrient(s), combinations of these, and the like. Other ingredients that can be included are gel-forming additives, stabilizers, sequestrants, etc. Optionally, the cultured dairy composition can further include a variety of adjuvant materials to modify the nutritional, organoleptic, flavor, color, or other properties of the composition. For example, the cultured dairy composition can additionally include synthetic and/or natural flavorings, and/or coloring agents can be used in the compositions of the invention. Any flavors typically included in cultured dairy compositions can be used in accordance with the teachings of the invention, including chocolate, caramel, and savory flavors (e.g., veggies/spices).

In the manufacture of Swiss-style yogurt, a fruit flavoring is blended substantially uniformly throughout the yogurt after fermentation is complete but prior to packaging. In the manufacture of "sundae"-style yogurt, fruit flavoring is deposited at the bottom of the consumer container, and the container is then filled with the yogurt mixture. To prepare a sundae-style yogurt product employing a stirred style yogurt, the milk base is prepared with added thickeners and/or stabilizers to provide, upon resting, a yogurt texture that mimics a "set"-style yogurt. In this variation, the fruit is added directly to the container, typically to the bottom, prior to filling with the yogurt.

Although specific embodiments have been illustrated and described herein, it will be appreciated by those of ordinary skill in the art that a variety of alternative and/or equivalent implementations can be substituted for the specific embodiments shown and described without departing from the scope of the present disclosure. Other cultured dairy products are also preferably produced by the method described above, including products made with mesophilic or thermophilic cultures which are fermented at 70-90° F. (21.1-32.2° C.). Overall the method provides a cultured dairy product that tastes relatively sweet but does not contain a large amount of sugars, such as lactose.

The invention claimed is:

1. A method for preparing a cultured dairy product, said method comprising:

blending:

water, ultra-filtered milk containing from 0.3% to 1.0% lactose, from 11% to 15% protein and about 0.3% fat, and at least one of condensed whole milk containing about 11.3% lactose, about 7.6% protein and about 15% fat and condensed skim milk containing about 19.4% lactose, about 12.7% protein and about 0.2% fat to form a fermentable dairy base containing about 1.6% lactose, about 3.9% protein and about 0.8% fat; and fermenting the fermentable dairy base to produce a cultured dairy product containing less than 1% lactose.

2. The method according to claim 1, further comprising: forming the fermentable dairy base by blending each of the water, ultra-filtered milk, condensed whole milk and condensed skim milk.

3. The method according to claim 2 further comprising: pasteurizing the fermentable dairy base at 90.6° C.

4. The method according to claim 1 further comprising: culturing the fermentable dairy base by adding yogurt starter culture and fermenting the fermentable dairy base at 25-47° C. for about 4 to 16 hours to produce a yogurt product.

5. The method according to claim 4 further comprising: cooling down the yogurt product.

6. The method according to claim 5 further comprising: warming up the yogurt product to 43.3° C.

7. The method according to claim 6 further comprising: separating the yogurt product in a centrifuge to obtain a separated yogurt product containing 0.7% lactose, about 11.5% protein and about 2.0% fat.

8. The method according to claim 7 further comprising: cooling down the separated yogurt product to less than 23.9° C.

9. The method according to claim 8 further comprising: subjecting the separated yogurt product to cavitation at about 60 Hz.

10. The method according to claim 9 further comprising: cooling down the separated yogurt product to less than 7.2° C. after subjecting the separated yogurt to cavitation.

11. The method according to claim 10 further comprising: producing a finished yogurt product containing less than 6% total sugar, greater than 10% protein and about 1.8% fat.

12. The method according to claim 1, further including separating the fermentable dairy base, and wherein the cultured dairy product has less than, about 11.5% protein and about 2.0% fat.

13. The method for preparing a cultured dairy product, said method comprising:

A) blending: water, ultra-filtered milk containing from 0.3% to 1.0% lactose, from 11% to 15% protein and about 0.3% fat, and other ingredients to form a fermentable dairy base containing about 1.6% lactose, about 3.9% protein and about 0.8% fat;

B) pasteurizing the fermentable dairy base;

C) culturing the fermentable dairy base by adding a starter culture and fermenting the fermentable dairy base to produce a dairy product; and D) further processing the dairy product with only mechanical steps to form a finished cultured dairy product containing less than 4% total sugar, greater than 10% protein and no more than 1.8% fat, with less than 1% of the total sugar being lactose.

14. The method according to claim 13, wherein the mechanical steps include subjecting the dairy product to cavitation at about 60 Hz.

15. The method according to claim 14, wherein the finished dairy product has less than about 1% lactose.

16. A method for preparing a cultured dairy product, said method comprising:

blending:

water, ultra-filtered milk containing from 0.3% to 1.0% lactose, from 11% to 15% protein, about 0.3% fat, and other streams of milk based products to form a fermentable dairy base containing about 1.6% lactose, about 2.7 to 4% protein and about 0 to 1.5% fat; and fermenting the fermentable dairy base to produce a cultured dairy product containing less than 1% lactose.

17. The method according to claim 16 further comprising: culturing the fermentable dairy base by adding yogurt starter culture and fermenting the fermentable dairy base at 44.4° C. for 5 hours to produce a yogurt product.

18. The method according to claim 16 wherein the fermentable dairy base contains about 1.6% lactose, about 3.9% protein and about 0.8% fat.

19. The method according to claim 18, further including separating the fermentable dairy base, and wherein the finished dairy product has less than about 1% lactose, about 11.5% protein and about 2.0% fat.

20. The method according to claim 15, wherein the mechanical steps include separating the dairy product in a centrifuge to obtain a separated cultured dairy product containing about 0.7% lactose.

* * * * *